(12) United States Patent
Cavalcante et al.

(10) Patent No.: US 8,989,050 B2
(45) Date of Patent: Mar. 24, 2015

(54) GRAPH-BASED DISTRIBUTED COORDINATION METHODS FOR WIRELESS COMMUNICATION NETWORKS

(71) Applicant: Telefonaktiebolaget L M Ericsson (publ), Stockholm (SE)

(72) Inventors: Charles Casimiro Cavalcante, Fortaleza (BR); Dennis Hui, Sunnyvale, CA (US); Igor Moáco Guerreiro, Fortaleza (BR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 303 days.

(21) Appl. No.: 13/688,561

(22) Filed: Nov. 29, 2012

(65) Prior Publication Data

US 2013/0142082 A1 Jun. 6, 2013

Related U.S. Application Data

(63) Continuation-in-part of application No. 13/308,776, filed on Dec. 1, 2011, now Pat. No. 8,879,428.

(60) Provisional application No. 61/654,239, filed on Jun. 1, 2012.

(51) Int. Cl.
 *H04L 12/28* (2006.01)
 *H04W 72/04* (2009.01)
 (Continued)

(52) U.S. Cl.
 CPC .......... *H04W 72/0426* (2013.01); *H04W 24/02* (2013.01); *H04W 16/02* (2013.01); *H04L 41/0823* (2013.01)
 USPC .......................................... 370/255; 370/254

(58) Field of Classification Search
 CPC .............................. H04W 72/00; H04W 24/00
 USPC .................................................. 370/254, 255
 See application file for complete search history.

(56) References Cited

U.S. PATENT DOCUMENTS

| | | | | |
|---|---|---|---|---|
| 2005/0078737 | A1* | 4/2005 | Craig et al. | 375/132 |
| 2007/0168832 | A1* | 7/2007 | Richardson et al. | 714/758 |

(Continued)

OTHER PUBLICATIONS

Ng, B. et al., "Distributed Downlink Beamforming with Cooperative Base Stations", IEEE Transactions on Information Theory, vol. 54, Issue 12, Dec. 2008, pp. 5491-5499.
(Continued)

*Primary Examiner* — Andrew Lai
*Assistant Examiner* — Sumitra Ganguly
(74) *Attorney, Agent, or Firm* — Withrow & Terranova, PLLC

(57) ABSTRACT

Systems and methods are disclosed for graph-based distributed parameter coordination in a communication network. In general, discrete local parameters to be coordinated among communication nodes in the communication network and their respective performance metrics, or costs, are modeled using a factor graph. Based on the factor graph, a variant of the sum-product algorithm, namely the min-sum algorithm, is applied in order for the communication nodes, through iterative message passing with their neighboring communication nodes, to decide upon optimal values for the local parameters for the communication nodes that collectively optimize a global performance metric across the communication network. In one embodiment, the communication network is a wireless communication network. In one specific embodiment, the wireless communication network is a cellular communication network.

28 Claims, 7 Drawing Sheets

(51) Int. Cl.
*H04W 24/02* (2009.01)
*H04W 16/02* (2009.01)
*H04L 12/24* (2006.01)

(56) References Cited

U.S. PATENT DOCUMENTS

| | | | |
|---|---|---|---|
| 2008/0212549 A1* | 9/2008 | Park et al. | 370/342 |
| 2008/0294960 A1* | 11/2008 | Sharon et al. | 714/752 |
| 2011/0080961 A1* | 4/2011 | Hui et al. | 375/259 |
| 2011/0189950 A1* | 8/2011 | Noh et al. | 455/39 |
| 2011/0231731 A1* | 9/2011 | Gross et al. | 714/760 |
| 2013/0072131 A1* | 3/2013 | Guey et al. | 455/68 |

OTHER PUBLICATIONS

Kschischang, F. et al., "Factor graphs and the sum-product algorithm", IEEE Transactions on Information Theory, vol. 47, No. 2, Feb. 2001, pp. 498-519.

Sohn, I. et al., "A Graphical Model Approach to Downlink Cooperative MIMO Systems", Global Telecommunications Conference 2010, Dec. 2010, pp. 1-5.

Guerrieiro, I. et al., "A Graph-Based Approach for Distributed Parameter Coordination in Wireless Communication Networks", IEEE Globecome 2012 Workshop, Dec. 3, 2012, pp. 152-156, Anaheim, California.

Ni, J. et al., "Performance Evaluation of Loss Networks via Factor Graphs and the Sum-Product Algorithm", 26th IEEE International Conference on Computer Communications (INFOCOM 2007), May 1, 2007, pp. 409-417.

Zhang, G. et al., "Linear Coordinate-Descent Message-Passing for Quadratic Optimization", 2012 IEEE International Conference on Acoustics, Speech and Signal Processing (ICASSP 2012), Mar. 25-30, 2012, pp. 2005-2008, Kyoto, Japan.

International Search Report for PCT/IB2012/056810, mailed Mar. 22, 2013, 13 pages.

Non-Final Office Action for U.S. Appl. No. 13/308,776, mailed Sep. 13, 2013, 21 pages.

\* cited by examiner

GRAPH-BASED DISTRIBUTED COORDINATION METHODS FOR WIRELESS COMMUNICATION NETWORKS

RELATED APPLICATIONS

This application is a Continuation-in-Part of U.S. application Ser. No. 13/308,776 entitled SYSTEMS AND METHOD FOR GRAPH-BASED DISTRIBUTED PARAMETER COORDINATION IN A COMMUNICATION NETWORK, filed Dec. 1, 2011, the disclosure of which is hereby incorporated herein by reference in its entirety. This application also claims the benefit of provisional patent application Ser. No. 61/654,239, filed Jun. 1, 2012, the disclosure of which is hereby incorporated herein by reference in its entirety.

FIELD OF THE DISCLOSURE

The present disclosure relates to a communication network and more particularly relates to distributed parameter coordination in a communication network.

BACKGROUND

In a communication network, such as a cellular communication network, local parameter settings of one communication node oftentimes influence the selection of local parameters of neighboring communication nodes in the communication network. For instance, it is sometimes necessary for each base station in a cellular communication network to select a set of parameters that is uniquely distinguishable from those selected by its neighboring base stations (i.e., base stations that serve neighboring cells in the cellular communication network). Take downlink transmission for example, each base station needs to transmit a locally unique Reference Signal (RS) for User Equipments (UEs) to identify the base station and to synchronize to the downlink transmission from the base station. The set of available reference signals is limited, and each base station needs to select (or be assigned) a reference signal that is different from the reference signals of its neighboring base stations. As another example, each base station may select (or be assigned) one of several frequency bands for transmission. If the same frequency band is only reused by other base stations serving cells that are far away, inter-cell interference can be significantly reduced. This is the classical frequency planning commonly practiced in second generation networks such as Global System for Mobile Communications (GSM) networks. There are also occasions when each base station may need to set a value to a parameter, such as transmit power, in such a way that the setting is compatible with those of the neighboring base stations in order to achieve a certain notion of optimality of the entire cellular communication network. These are just some typical problems encountered in the design of a cellular communication network in which a local parameter setting influences and is influenced by the settings of the neighboring cells.

Some of these problems, such as RS and frequency reuse, are typically static in nature and can therefore be solved by advanced planning during the build out of the cellular communication network. Currently, the parameters are set by planning tools that have access to information such as base station locations and radio propagation characteristics. Once a solution that is optimal network-wise is found, it remains unchanged for a long time until the deployment changes. However, other problems, such as transmit power control, are more dynamic in nature and require more frequent updates as the channel conditions vary. Methods that allow base stations to dynamically adjust their choice of parameters are therefore quite desirable.

Recently, there have been new applications in which the setting of conventional long-term parameters, such as frequency and RS reuse, also needs to adapt to short term changes and there is no central controller to oversee the update of the parameters. For example, in device-to-device communication, the UE locations change over time. Moreover, arrival and departure of devices also alter the system topology, and thus neighboring relationships, dynamically at a very fast pace. If the same RS selection or frequency reuse setting is to be performed in such a distributed network, a distributed mechanism must be employed.

As such, there is a need for systems and methods for distributed parameter coordination in a communication network, such as a cellular communication network.

SUMMARY

Systems and methods are disclosed for graph-based distributed parameter coordination in a communication network. In general, discrete local parameters to be coordinated among communication nodes in the communication network and their respective performance metrics, or costs, are modeled using a factor graph. Based on the factor graph, a variant of the sum-product algorithm, namely the min-sum algorithm, is applied in order for the communication nodes, through iterative message passing with their neighboring communication nodes, to decide upon optimal values for the local parameters for the communication nodes that collectively optimize a global performance metric across the communication network. In one embodiment, the communication network is a wireless communication network. In one specific embodiment, the wireless communication network is a cellular communication network.

In one embodiment, a communication node in a communication network iteratively exchanges messages with neighboring communication nodes of the communication node in the communication network based on a factor graph until a predefined stopping criteria is satisfied. The factor graph models discrete local parameters to be coordinated among communication nodes in the communication network and corresponding performance metrics of the communication nodes. In one embodiment, the messages are exchanged according to a min-sum algorithm. The communication node computes an optimal value for the local parameter of the communication node based on results of iteratively exchanging the messages with the plurality of neighboring communication nodes. The optimal value for the local parameter of the communication node and corresponding optimal values determined for local parameters of other communication nodes in the communication network together optimize a global performance metric for the communication network.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 3:
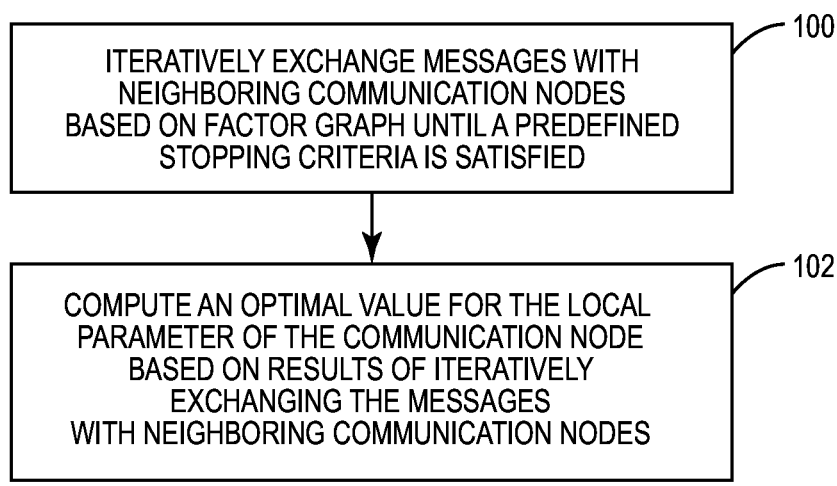
Figure 4:
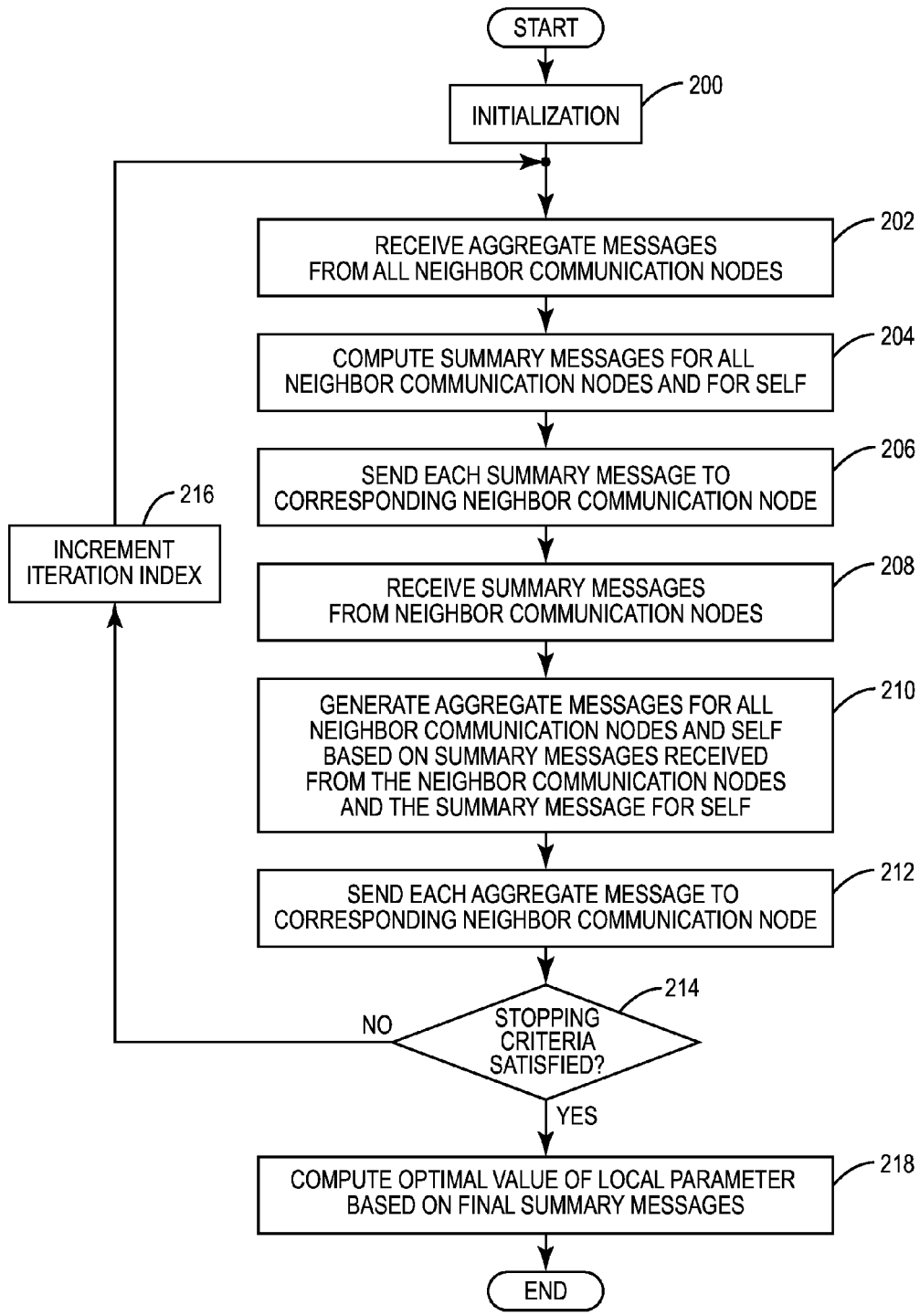
Figure 5:
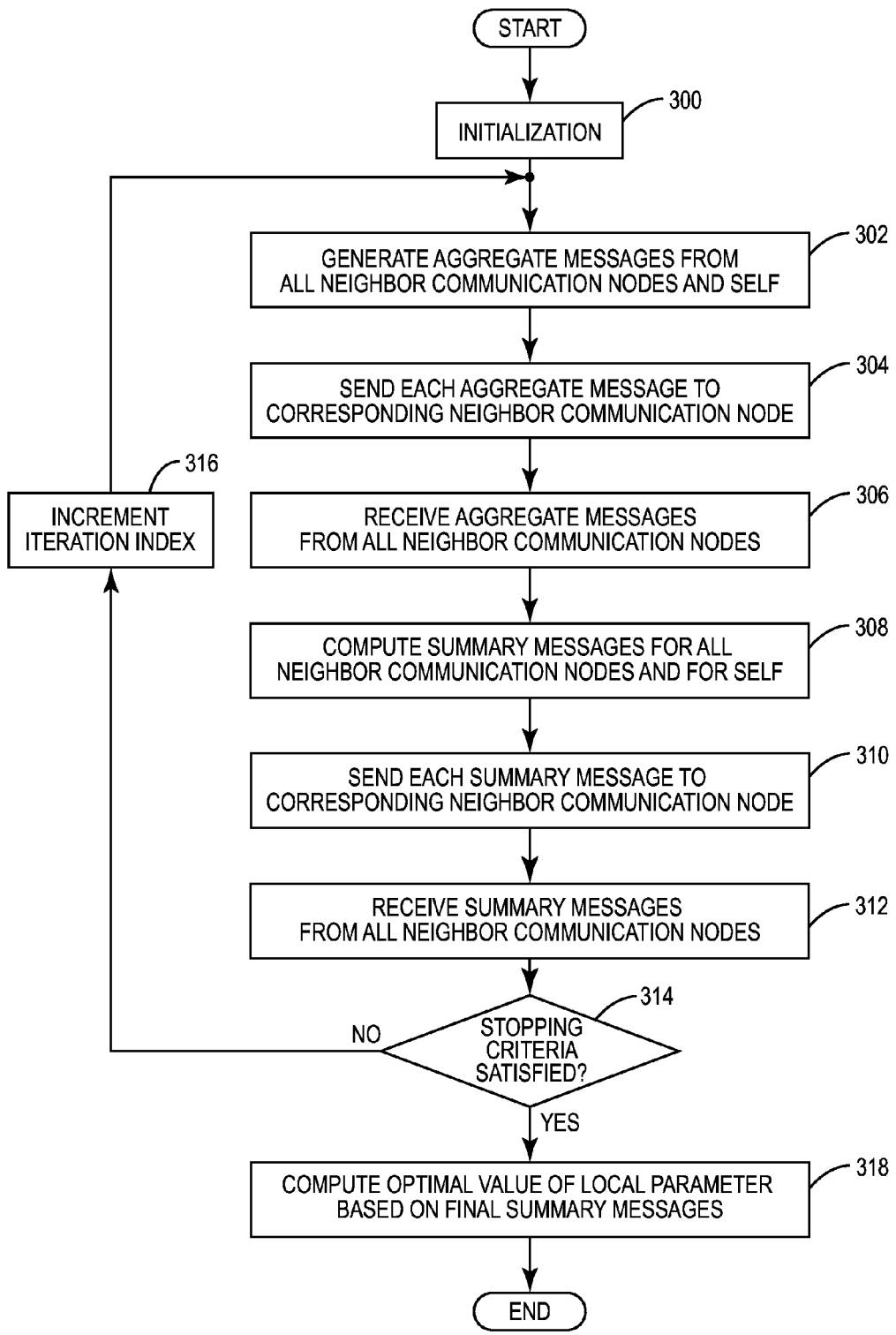
Figure 6:
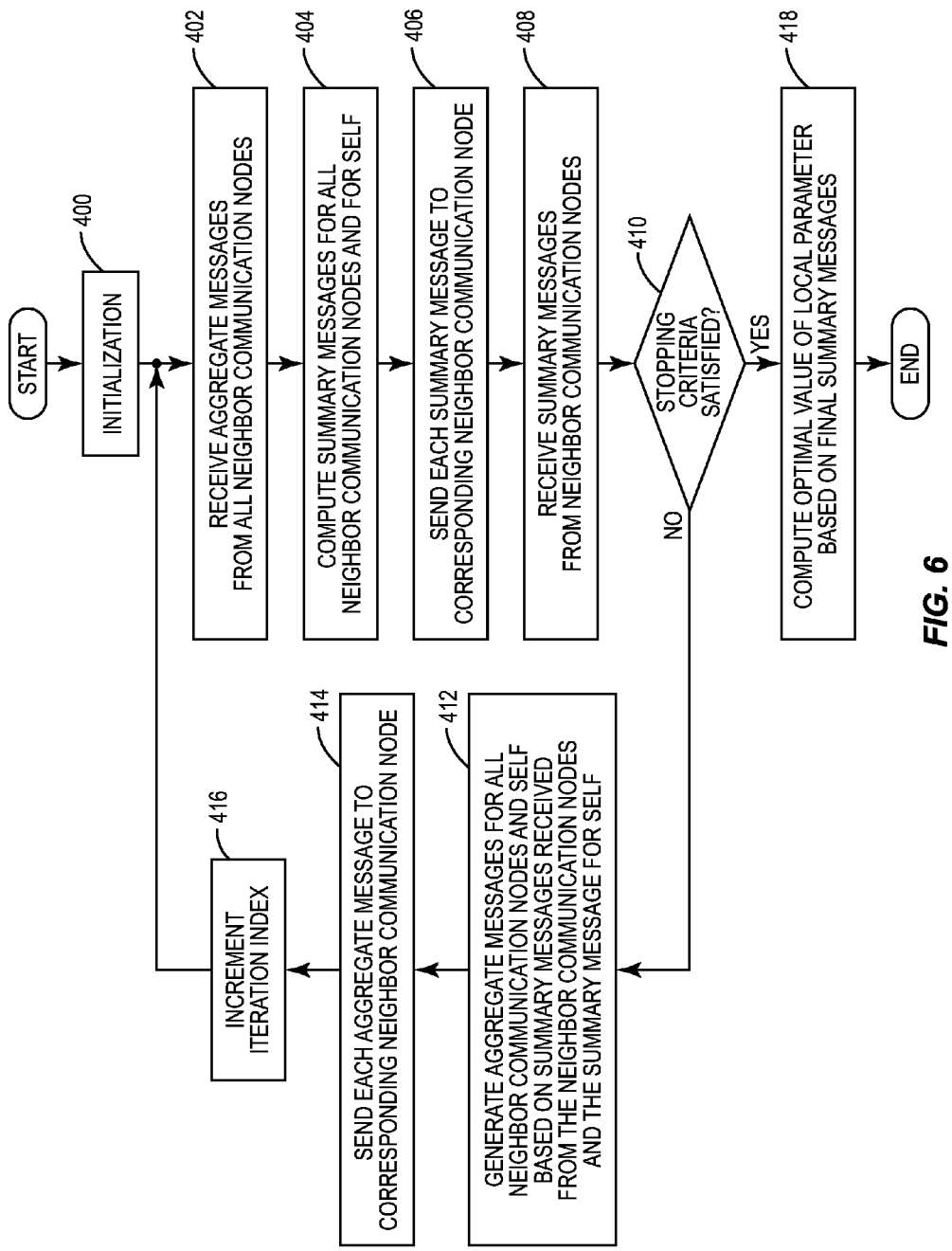
Figure 7:
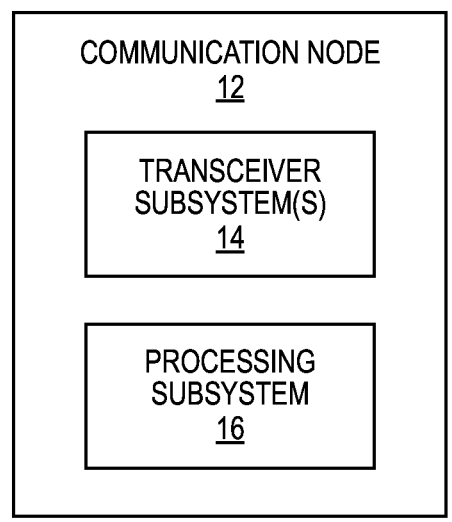

FIG. 3 is a flow chart illustrating the operation of each of the communication nodes to, based on the factor graph modeling the communication nodes in the cellular communication network, iteratively exchange messages with its neighboring communication nodes to determine an optimal value for its local parameter that together with similarly determined optimal parameters for the other communication nodes in the cellular communication network collectively optimize a global performance metric across the cellular communication network according to one embodiment of the present disclosure;

FIG. 4 is a more detailed embodiment of the flow chart of FIG. 3 according to one embodiment of the present disclosure;

FIG. 5 is a more detailed embodiment of the flow chart of FIG. 3 according to another embodiment of the present disclosure;

FIG. 6 is a more detailed embodiment of the flow chart of FIG. 3 according to another embodiment of the present disclosure; and FIG. 7 is a block diagram of an exemplary communication node.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
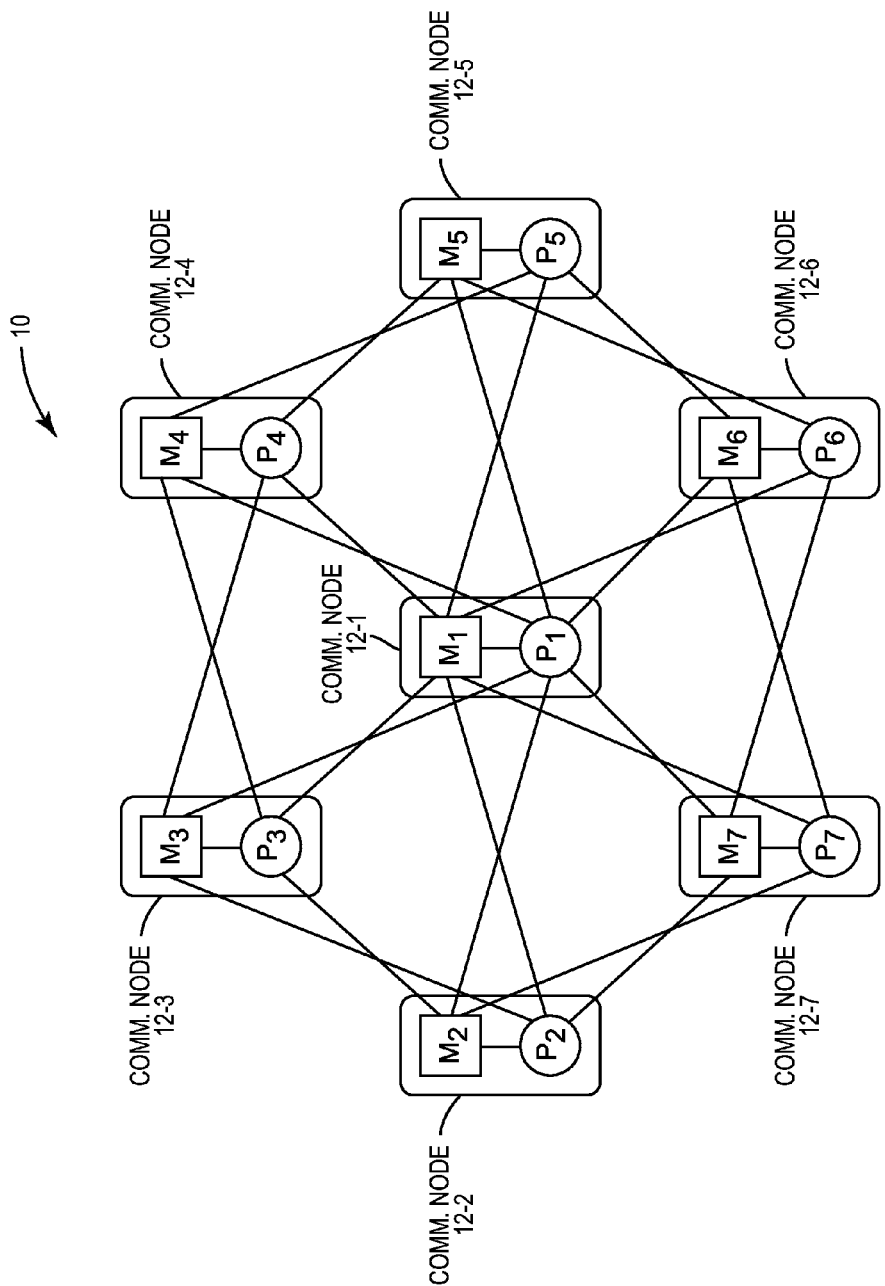
FIG. 1 illustrates a cellular communication network where discrete local parameters to be coordinated among communication nodes in the cellular communication network and their respective performance metrics, or costs, are modeled using a factor graph according to one embodiment of the present disclosure.

FIG. 1 illustrates a cellular communication network 10 incorporating systems and methods for distributed parameter coordination according to one embodiment of the present disclosure. Before proceeding, it should be noted that while this disclosure focuses on the cellular communication network 10, the concepts described herein are equally applicable to wired communication networks and other types of wireless communication networks (e.g., WiFi networks). As illustrated, the cellular communication network 10 includes a number of communication nodes 12-1 through 12-7, which are generally referred to herein as communication nodes 12 or individually as communication node 12. The communication nodes 12 may be base stations in the cellular communication network 10, user equipments (UEs), or mobile stations in the cellular communication network 10, or the like. As used herein, the term "base station" refers to a Node B, enhanced Node B (eNodeB), or other suitable type of base station in a cellular communication network such as the cellular communication network 10, whereas the term "access node" is a more general term that refers to an access node in any type of wireless communication network (e.g., an access node in a WiFi network or a base station in a cellular communication network). Note that while only seven communication nodes 12 are illustrated for clarity and ease of discussion, it should be appreciated that the cellular communication network 10 may include any number of communication nodes 12.

Considering the cellular communication network 10 with N communication nodes 12, let $p_i$, for $i=1, 2, \ldots, N$, denote a discrete local parameter of the i-th communication node 12 (referred to as communication node i) whose value is drawn from a finite set $\mathcal{P}_i$ of possible parameter values for the i-th communication node i. Also, let $\mathbf{p} \equiv [p_1, p_2, \ldots, p_N]^T$ be a vector collecting the local parameters of all of the communication nodes 12 in the cellular communication network 10. Each communication node i is associated with a list $\mathcal{N}_i$ of "proper" neighboring communication nodes (i.e., excluding communication node i) whose choices of parameter values can affect the local performance of communication node i. For convenience, also let $\mathcal{A}_i \equiv \mathcal{N}_i \cup \{i\}$ denote the "inclusive" neighbor list of communication node i. Let $\mathbf{P}_{\mathcal{A}_i}$ denote the vector of those parameters of nodes in $\mathcal{A}_i$, with its ordering of parameters determined by the sorted indices in $\mathcal{A}_i$. Associated with each communication node i is a performance metric or cost, denoted by $M_i(\mathbf{P}_{\mathcal{A}_i})$, which is a function of those parameters in the inclusive neighbor list $\mathcal{A}_i$ of communication node i. Each communication node i is assumed to be capable of communicating with all communication nodes 12 in $\mathcal{A}_i$. The goal is for each communication node i to find, in a distributed fashion, its own optimal parameter $p_i^*$, which is the corresponding component of the optimal global parameter vector $\mathbf{p}^*$ that minimizes a weighted global performance metric given by:

$$M(\mathbf{P}) \equiv \sum_{i=1}^{N} w_i M_i(\mathbf{P}_{\mathcal{A}_i}), \tag{1}$$

where $w_i$ denotes a weight associated with the local performance metric $M_i(\mathbf{P}_{\mathcal{A}_i})$. Note that, equivalently, Equation (1) may be rewritten such that each of the weights $w_i$ is incorporated into the corresponding local performance metric $M_i(\mathbf{P}_{\mathcal{A}_i})$. In other words, Equation (1) may equivalently be represented as:

$$M(\mathbf{P}) \equiv \sum_{i=1}^{N} M_i(\mathbf{P}_{\mathcal{A}_i})$$

where each of the local performance metrics $M_i(\mathbf{P}_{\mathcal{A}_i})$ incorporates the corresponding weight $w_i$ from Equation (1).

The present disclosure provides systems and methods for solving the problem above by modeling the communication nodes 12 and the associated local performance metrics using a factor graph. A factor graph is a bipartite graph consisting of a set of variable nodes and a set of factor nodes. Each variable node represents a variable and can only be connected to a factor node, but not another variable node. Each factor node represents a function of some of the variables. A factor node is connected to a variable node if and only if the corresponding function represented by the factor node depends on that variable.

For the cellular communication network 10, the local parameters (p) of the communication nodes 12 are represented as variable nodes $v(p_1)$ through $v(p_7)$, and the local metrics (M) of the communication nodes 12 are represented as factor nodes $v(M_1)$ through $v(M_7)$. More specifically, each communication node i is modeled by a variable node that represents the local parameter $p_i$ of the communication node i and a factor node that represents the local metric $M_i(\mathbf{P}_{\mathcal{A}_i})$ of the communication node i. Accordingly, a variable node corresponding to $p_i$ is labeled as $v(p_i)$, and a factor node corresponding to $M_i(\mathbf{P}_{\mathcal{A}_i})$ is labeled as $v(M_i)$. An edge connecting a factor node $(M_i)$ with variable node $v(p_k)$ exists if and only if $k \in \mathcal{A}_i$. For example, FIG. 1 shows a hexagonal layout of seven communication nodes 12-1 through 12-7, each associated with a factor node representing the local performance metric $M_i(\mathbf{P}_{\mathcal{A}_i})$ and a variable node representing the local parameter $p_i$. The factor node associated with the local performance metric $M_i(\mathbf{P}_{\mathcal{A}_i})$ of communication node i is connected through edges to the respective variable nodes associated with its own local parameter $p_i$ those parameters $\{p_i\}_{i \in \mathcal{N}_i}$ of its neighboring communication nodes 12 upon which the metric $M_i(\mathbf{P}_{\mathcal{A}_i})$ depends.

Figure 2:
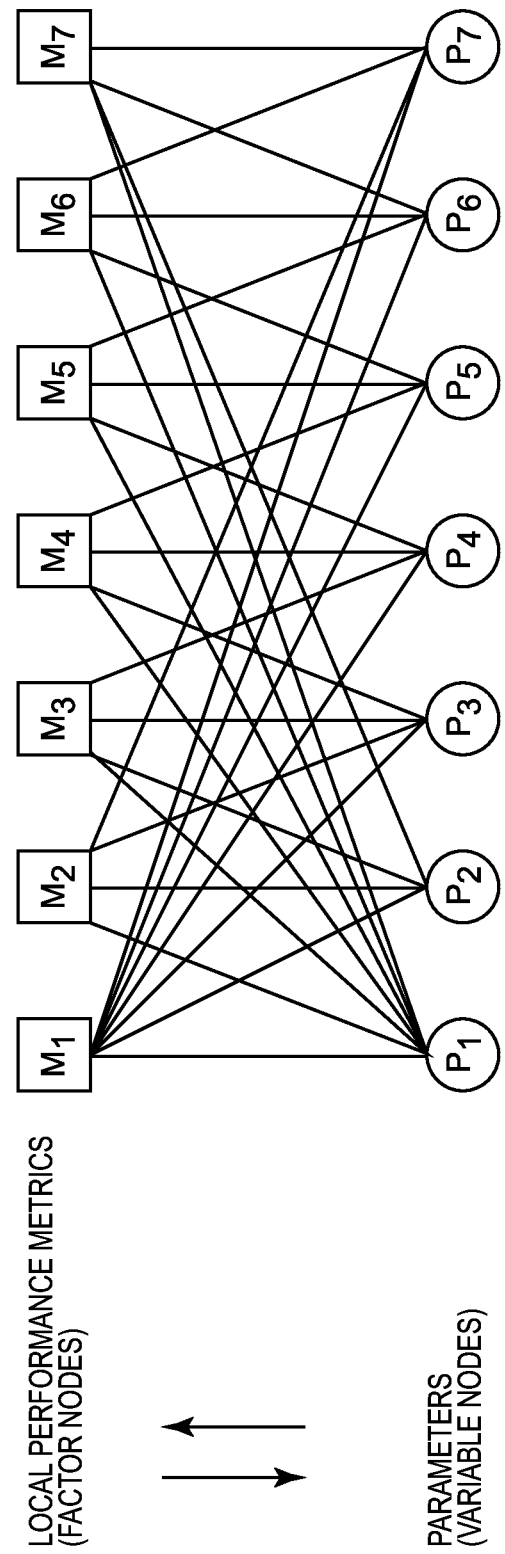
FIG. 2 is a re-organized factor graph for the cellular communication network of FIG. 1 that illustrates relationships between factor nodes that represent local performance metrics of the communication nodes and variable nodes that represent the local parameters of the communication nodes according to one embodiment of the present disclosure.

FIG. 2 is a re-organized factor graph for the cellular communication network 10 of FIG. 1. The re-organized factor graph clearly shows the bipartite property of the factor graph with factor nodes connected only to variable nodes through respective edges. As discussed below, a message passing algorithm is executed based on the factor graph in order to perform distributed coordination of the local parameters (p) of the communication nodes 12 to collectively optimize the global performance metric for the cellular communication network 10. The message passing algorithm is preferably a min-sum algorithm. Those messages that are passed on edges connecting factor and variable nodes for different communication nodes (e.g., communication nodes 12-1 and 12-2) correspond to information exchanged between two neighboring communication nodes 12, while those messages that are passed on edges that connect factor and variable nodes for the same communication node (e.g., communication node 12-1) represent internal communications within those communication nodes 12. Each message depends only on the variable whose associated variable node is a vertex of the edge over which the message is passed along. More precisely, each message is simply a table of values with each entry corresponding to one of the possible values of the variable, as described in more detail below.

The sum-product algorithm can be applied whenever the variables and functions associated with the factor graph are defined on a commutative semiring whose elements satisfy the distributive law. For our problem at hand, a variant of the sum-product algorithm is applied that is based on the min-sum commutative semiring. In this case, the sum-product algorithm is also called the min-sum algorithm. Recall that a semiring is a mathematical structure equivalent to a ring without an additive inverse. A min-sum semiring simply replaces the addition operation with the minimum operation and the multiplication operation with the addition operation.

More specifically, let $\mu_{M_i \to p_k}(p_k)$ denote a message, referred to herein as a summary message, to be passed from a factor node $v(M_i)$ to a variable node $v(p_k)$, and let $\mu_{p_k \to M_i}(p_k)$ denote a message, referred to herein as an aggregate message, to be passed from the variable node $v(p_k)$ to the factor node $v(M_i)$. The min-sum algorithm, when applied to our problem at hand, simply iterates between the following two kinds of message computations and exchanges:

$$\mu_{M_i \to p_k}(p_k) = \min_{\mathbf{P}_{\mathcal{A}_i \setminus \{k\}}} \left\{ w_i M_i(\mathbf{P}_{\mathcal{A}_i}) + \sum_{j \in \mathcal{A}_i \setminus \{k\}} \mu_{p_j \to M_i}(p_j) \right\}, \quad (2)$$

$$\mu_{p_k \to M_i}(p_k) = \sum_{j \in \mathcal{A}_k \setminus \{i\}} \mu_{M_j \to p_k}(p_k). \quad (3)$$

Note that both messages computed in Equations (2) and (3) depend only on the value of $p_k$. Since $p_k \in \mathcal{P}$ and $\mathcal{P}$ is assumed to be discrete and finite, each of the messages can be represented by a table of $|\mathcal{P}_k|$ entries, where $|\mathcal{P}_k|$ denotes the cardinality of $\mathcal{P}_k$. In Equation (2), the summary message $\mu_{M_i \to p_k}(p_k)$ is a table of $|\mathcal{P}_k|$ values, where each value in the summary message is a minimum value determined from Equation (2) for a corresponding one of the possible values $\mathcal{P}$ for $p_k$. In Equation (3), the aggregate message $\mu_{p_k \to M_i}(p_k)$ $\mu_{p_k \to M_i}(p_k)$ is a table of $|\mathcal{P}_k|$ values, where each value in the aggregate message is a summation of the values from the summary messages $\mu_{M_j \to p_k}(p_k)$ received from communication nodes $j \in \mathcal{A}_k \setminus \{i\}$ (i.e., the neighboring communication nodes 12 in the inclusive list of neighboring communication nodes for the communication node k other than the communication node i for which the aggregate message is generated).

The min-sum algorithm may begin with each factor node $v(M_i)$ computing an outgoing summary message $\mu_{M_i \to p_k}(p_k)$ to $v(p_k)$ for each $k \in \mathcal{A}_i$ using Equation (2) with all aggregate messages $\mu_{p_k \to M_i}(p_k)$ from connected variable nodes initialized to certain predetermined values. Upon receipt of the summary message $\mu_{M_i \to p_k}(p_k)$, each variable node $v(p_k)$ then computes a summary message $\mu_{p_k \to M_i}(p_k)$ $\mu_{p_k \to M_i}(p_k)$ to $v(M_i)$ for each $i \in \mathcal{A}_k$. The algorithm then iterates until certain stopping criteria, such as a pre-determined maximum number of iterations, is reached, in which case the optimal value for the local parameter for communication node i is determined at its variable node $v(p_i)$ by:

$$p_i^* = \operatorname*{argmin}_{p_i} \left\{ \sum_{j \in \mathcal{A}_i} \mu_{M_j \to p_i}(p_i) \right\}. \quad (4)$$

When the factor graph contains no cycle, the message passing algorithm described above will yield the exact optimal solution that minimizes the global performance metric (Equation (1)). However, when the factor graph contains cycle, as it often does in many practical applications such as the problem of interest, Equation (4) yields a good approximation to the true optimal solution.

FIG. 3 is a flow chart illustrating the operation of one of the communication nodes 12 according to one embodiment of the present disclosure. Note that FIG. 3 is equally applicable to the other communication nodes 12 in the cellular communication network 10 such that, based on the factor graph modeling of the communication nodes 12 in the cellular communication network 10, the communication nodes 12 iteratively exchange messages with their neighboring communication nodes to determine optimal values for their local parameters that collectively optimize the global performance metric across the cellular communication network 10 according to one embodiment of the present disclosure.

As illustrated, the communication node 12 iteratively exchanges messages with the neighboring communication nodes 12 based on the factor graph until a predefined stopping criteria is satisfied (step 100). In the preferred embodiment, the messages are summary messages and aggregate messages generated according to Equations (2) and (3) above. The stopping criteria may be, for example, a predefined maximum number of iterations. However, other stopping criteria may alternatively be used. For example, the stopping criteria may be that the maximum percentage change in all the summary messages received by a variable node after an iteration is less than a certain predetermined threshold. It should also be noted that the communication node 12 may iteratively exchange the messages with the neighboring communication nodes 12 according to a predefined schedule. The predefined schedule may be defined such that convergence of the min-sum algorithm is improved. For example, the predefined schedule may be such that on average, 90% of the communication nodes 12 are randomly selected to generate and exchange the messages in each iteration of the min-sum algorithm (i.e., only 90% of the communication nodes 12 participate when averaged over many iterations; some iterations may have more while some iterations may have less). Conversely, the predefined schedule may be such that on average, 10% of the communication nodes 12 are randomly selected to not participate in each iteration. The random selection process may be carried out by independently generating a pseudo random number at each communication node 12 and comparing it against a threshold predetermined according to the desired faction of communication nodes 12 that participate in each iteration. Once the predefined stopping criteria is satisfied, the communication node 12 determines or otherwise computes the optimal value for the local parameter of the communication node 12 (step 102). In the preferred embodiment, the optimal value is computed according to Equation (4).

FIG. 4 is a more detailed embodiment of the flow chart of FIG. 3 according to one embodiment of the present disclosure. Again, while this process is described with respect to one of the communication nodes 12, it should be understood that this process is performed by each of the communication nodes 12 in the cellular communication network 10 in order to determine the optimal values for the local parameters of the communication nodes 12 in a distributed, coordinated manner that optimizes the global performance metric of the cellular communication network 10.

First, the communication node 12 (which for the remaining discussion of FIG. 4 is referred to as communication node i) performs an initialization process (step 200). At this point, an iteration index (n) is set to zero (i.e., n=0). During the initialization process, the communication node i initializes an aggregate message of the communication node i ($\mu_{p_i \to M_k}^{(0)}(p_k)$) to an initial value, and sends the aggregate message to the neighboring communication nodes $k \in \mathcal{N}_i$. For example, the communication node i may set $\mu_{p_i \to M_k}^{(0)}(p_i)=0$ for some value of $p_i$ in $\mathcal{P}_i$ and set $\mu_{p_i \to M_k}^{(0)}(p_i)=\epsilon$ for all other values of $p_i$ in $\mathcal{P}_i$, for all $k \in \mathcal{A}_i$, to indicate initial preference of communication node i, where $\epsilon$ denotes a small positive number such as 0.01. Next, the communication node i receives the aggregate messages from all of the neighboring communication nodes $k \in \mathcal{N}_i$ of the communication node i (step 202). Specifically, the aggregate messages are received from the variable nodes $v(p_k)$ of all of the neighboring communication nodes $k \in \mathcal{N}_i$ of the communication node i.

The communication node i, and specifically the factor node of the communication node i, then computes summary messages for each of the neighboring communication nodes $k \in \mathcal{N}_i$ of the communication node i and a summary message for the communication node i itself (step 204). More specifically, the summary messages are computed based on Equation (2) above. Specifically, the summary messages are computed based on:

$$\mu_{M_i \to p_k}^{(n+1)}(p_k) = \min_{p_{\mathcal{A}_i \backslash \{k\}}} \left\{ w_i M_i(p_{\mathcal{A}_i}) + \mu_{p_i \to M_i}^{(n)}(p_i) + \sum_{j \in N_i \backslash \{k\}} \mu_{p_j \to M_i}^{(n)}(p_j) \right\} = \quad (5)$$

$$\min_{p_{\mathcal{A}_i \backslash \{k\}}} \left\{ w_i M_i(p_{\mathcal{A}_i}) + \mu_{p_i \to M_i}^{(n)}(p_i) - \mu_{p_k \to M_i}^{(n)}(p_k) + \sum_{j \in N_i} \mu_{p_j \to M_i}^{(n)}(p_j) \right\}$$

for each neighboring communication node $k \in \mathcal{A}_i$, by hypothesizing each possible value of $p_k$ in $\mathcal{P}_k$ and finding the best corresponding set of parameters $\mathbf{p}_{\mathcal{A}_i \backslash \{k\}}$ that minimizes the quantity in brackets above.

More specifically, in order to understand Equation (5), one must first understand that $M_i(\mathbf{p}_{\mathcal{A}_i})$ is essentially a multi-dimensional table that includes a value for the local performance metric for communication node i for each possible combination of values for vector $\mathbf{p}_{\mathcal{A}_i}$, which is a vector of the local performance metrics of the inclusive list of neighboring communication nodes for communication node i. Then, in order to compute the summary message to be sent to communication node k, the communication node i first hypothesizes that $p_k$ is one of the possible values in $\mathcal{P}_k$. Then, using the hypothesized value for $p_k$, $M_i(\mathbf{p}_{\mathcal{A}_i})$ becomes a multi-dimensional table for all possible combinations of values for $\mathbf{p}_{\mathcal{A}_i}$ with $p_k$ equal to the hypothesized value for $p_k$. Each value in the multi-dimensional table is then summed with a discrete value that is equal to a summation of the values from the aggregate message $\mu_{p_j \to M_i}^{(n)}(p_j)$ for $j \in \mathcal{A}_i \backslash \{k\}$ for the hypothesized value for $p_k$. A minimum value from the resulting multi-dimensional table is then determined. A value in the summary message $\mu_{M_i \to p_k}^{(n+1)}(p_k)$ corresponding to the hypothesized value for $p_k$ is then set equal to the minimum value determined for the hypothesized value for $p_k$. This process is repeated for each of the other possible values $\mathcal{P}_k$ for $p_k$. In this manner, the summary messages $\mu_{M_i \to p_k}^{(n+1)}(p_k)$ are computed for all of the communication nodes $k \in \mathcal{A}_i$. Note that to reduce computational complexity, the minimization operation in step 204 can be computed through a standard alternating-coordinate optimization technique, i.e., starting with an arbitrary choice of $\mathbf{p}_{\mathcal{A}_i \backslash \{k\}}$ and optimizing each parameter in $\mathbf{p}_{\mathcal{A}_i \backslash \{k\}}$ one at a time while holding the other parameters fixed.

The communication node i then sends each of the summary messages $\mu_{M_i \to p_k}^{(n+1)}(p_k)$ for $k \in \mathcal{N}_i$ (i.e., the summary messages for the proper neighboring communication nodes of the communication node i) to the corresponding neighboring communication node k (step 206). The communication node i also receives similarly computed summary messages from the proper neighboring communication nodes of the communication node i (step 208).

The communication node i then generates aggregate messages $\mu_{p_i \to M_k}^{(n+1)}(p_i)$ for $k \in \mathcal{N}_i$ (i.e., for each of the proper neighboring communication nodes of the communication node i) as well as an aggregate message $\mu_{p_i \to M_k}^{(n+1)}(p_i)$ for k={i} (i.e., for the communication node i itself) (step 210). More specifically, the communication node i generates the aggregate messages according to Equation (3) above. More specifically, the communication node i generates the aggregate messages based on:

$$\mu_{p_i \to M_k}^{(n+1)}(p_i) = \mu_{M_i \to p_i}^{(n+1)}(p_i) + \sum_{j \in N_i \setminus \{k\}} \mu_{M_j \to p_i}^{(n+1)}(p_i) = \quad (6)$$

$$\mu_{M_i \to p_i}^{(n+1)}(p_i) - \mu_{M_k \to p_i}^{(n+1)}(p_i) + \sum_{j \in N_i} \mu_{M_j \to p_i}^{(n+1)}(p_i)$$

for each neighboring communication node $k \in \mathcal{A}_i$ by summing the summary messages $\{\mu_{M_j \to p_i}^{(n+1)}(p_i)\}_{j \in \mathcal{N}_i}$.

The communication node i then sends each of the aggregate messages $\mu_{p_i \to M_k}^{(n+1)}(p_i)$ to the corresponding neighboring communication node k (step 212). In this embodiment, the communication node i next determines whether the predefined stopping criteria has been satisfied (step 214). If not, the iteration index is incremented (step 216), and the process returns to step 202 and is repeated. If the predefined stopping criteria has been satisfied, the communication node i computes an optimal value $p_i^*$ for the local parameter of the communication node i based on the summary messages from the final iteration (i.e., the final summary messages) (step 218). More specifically, the optimal value $p_i^*$ for the local parameter of the communication node i is computed based on:

$$p_i^* = \arg\min_{p_i} \left\{ \sum_{j \in \mathcal{A}_i} \mu_{M_j \to p_i}^{(n_f)}(p_i) \right\}. \quad (7)$$

Equation (7) returns one of the possible values for the local parameter $p_i$ of the communication node i that corresponds to the minimum value in the table resulting from the summation of the final summary messages.

FIG. 5 is a more detailed embodiment of the flow chart of FIG. 3 according to another embodiment of the present disclosure. Notably, FIG. 5 is substantially the same as FIG. 4 but where the stopping criteria is checked after sending and receiving summary messages rather than after generating and sending the aggregate messages as in FIG. 4. Again, while this process is described with respect to one of the communication nodes 12, it should be understood that this process is performed by each of the communication nodes 12 in the cellular communication network 10 in order to determine the optimal values for the local parameters of the communication nodes 12 in a distributed, coordinated manner that optimizes the global performance metric of the cellular communication network 10.

First, the communication node 12 (which for the remaining discussion of FIG. 4 is referred to as communication node i) performs an initialization process (step 300). At this point, an iteration index (n) is set to zero (i.e., n=0). During the initialization process, the communication node i initializes all messages to predetermined values. In particular, the communication node i initializes the summary messages from the communication node i for n=0 (i.e., $\mu_{M_i \to p_k}^{(0)}(p_k)$) for all $k \in \mathcal{A}_i$. In order to initialize the summary messages $\mu_{M_i \to p_k}^{(0)}(p_k)$ for the communication node i, the communication node i first initializes the aggregate messages $\mu_{p_i \to M_k}^{(0)}(p_i)$ from the communication node i for all $k \in \mathcal{A}_i$ to some predetermined initial values (e.g., 0 for some value of $p_i$ and $\epsilon$=0.01 for all other values of $p_i$) and then sends the aggregate messages for $k \in \mathcal{N}_i$ to the corresponding neighboring communication nodes k. Likewise, the communication node i then receives aggregate messages from its neighboring communication nodes k for $k \in$ $\mathcal{N}_i$. The communication node i then computes the summary messages $\mu_{M_i \to p_k}^{(0)}(p_k)$ for all $k \in \mathcal{A}_i$ for n=0 using:

$$\mu_{M_i \to p_k}^{(0)}(p_k) = \min_{P_{\mathcal{A}_i \setminus \{k\}}} \left\{ w_i M_i(p_{\mathcal{A}_i}) + \mu_{p_i \to M_i}^{(0)}(p_i) + \sum_{j \in N_i \setminus \{k\}} \mu_{p_j \to M_i}^{(0)}(p_j) \right\} = \quad (8)$$

$$\min_{P_{\mathcal{A}_i \setminus \{k\}}} \left\{ w_i M_i(p_{\mathcal{A}_i}) + \mu_{p_i \to M_i}^{(0)}(p_i) - \mu_{p_k \to M_i}^{(0)}(p_k) + \sum_{j \in N_i} \mu_{p_j \to M_i}^{(0)}(p_j) \right\}.$$

The communication node i then generates aggregate messages $\mu_{p_i \to M_k}^{(n+1)}(p_i)$ for $k \in \mathcal{N}_i$ (i.e., for each of the proper neighboring communication nodes of the communication node i) as well as an aggregate message $\mu_{p_i \to M_k}^{(n+1)}(p_i)$ for k={i} (i.e., for the communication node i itself) (step 302). More specifically, the communication node i generates the aggregate messages according to Equation (3) above. More specifically, the communication node i generates the aggregate messages based on:

$$\mu_{p_i \to M_k}^{(n+1)}(p_i) = \mu_{M_i \to p_i}^{(n+1)}(p_i) + \sum_{j \in N_i \setminus \{k\}} \mu_{M_j \to p_i}^{(n+1)}(p_i) = \quad (9)$$

$$\mu_{M_i \to p_i}^{(n+1)}(p_i) - \mu_{M_k \to p_i}^{(n+1)}(p_i) + \sum_{j \in N_i} \mu_{M_j \to p_i}^{(n+1)}(p_i)$$

for each neighboring communication node $k \in \mathcal{A}_i$ by summing the summation messages $\{\mu_{M_j \to p_i}^{(n+1)}(p_i)\}_{j \in \mathcal{N}_i}$.

The communication node i then sends each of the aggregate messages $\mu_{p_i \to M_k}^{(n+1)}(p_i)$ to the corresponding neighboring communication node k (step 304). In this embodiment, next, the communication node i receives the aggregate messages from all of the neighboring communication nodes $k \in \mathcal{N}_i$ of the communication node i (step 306). Specifically, the aggregate messages are received from the variable nodes $v(p_k)$ of all of the neighboring communication nodes $k \in \mathcal{N}_i$ of the communication node i.

The communication node i, and specifically the factor node of the communication node i, then computes summary messages for each of the neighboring communication nodes $k \in \mathcal{N}_i$ of the communication node i and a summary message for the communication node i itself (step 308). More specifically, the summary messages are computed based on Equation (2) above. Specifically, the summary messages are computed based on:

$$\mu_{M_i \to p_k}^{(n+1)}(p_k) = \quad (10)$$

$$\min_{P_{\mathcal{A}_i \setminus \{k\}}} \left\{ w_i M_i(p_{\mathcal{A}_i}) + \mu_{p_i \to M_i}^{(n)}(p_i) + \sum_{j \in N_i \setminus \{k\}} \mu_{p_j \to M_i}^{(n)}(p_j) \right\} =$$

$$\min_{P_{\mathcal{A}_i \setminus \{k\}}} \left\{ w_i M_i(p_{\mathcal{A}_i}) + \mu_{p_i \to M_i}^{(n)}(p_i) - \mu_{p_k \to M_i}^{(n)}(p_k) + \sum_{j \in N_i} \mu_{p_j \to M_i}^{(n)}(p_j) \right\}$$

for each neighboring communication node $k \in \mathcal{A}_i$, by hypothesizing each possible value of $p_k$ in $\mathcal{P}_k$ and finding the best corresponding set of parameters $\mathbf{P}_{\mathcal{A}_i \setminus \{k\}}$ that minimizes the quantity in brackets above, as discussed above with respect to step 204 of FIG. 4.

The communication node i then sends each of the summary messages $\mu_{M_i \to p_k}^{(n+1)}(p_k)$ for $k \in \mathcal{N}_i$ (i.e., the summary messages for the proper neighboring communication nodes of the communication node i) to the corresponding neighboring communication node k (step 310). The communication node i also receives similarly computed summary messages from the proper neighboring communication nodes of the communication node i (step 312).

Next, in this embodiment, the communication node i determines whether the predefined stopping criteria has been satisfied (step 314). If not, the iteration index is incremented (step 316), and the process returns to step 302 and is repeated. If the predefined stopping criteria has been satisfied, the communication node i computes an optimal value $p_i^*$ for the local parameter of the communication node i based on the summary messages from the final iteration (i.e., the final summary messages) (step 318). More specifically, the optimal value $p_i^*$ for the local parameter of the communication node i is computed based on:

$$p_i^* = \underset{p_i}{\operatorname{argmin}} \left\{ \sum_{j \in \mathcal{A}_i} \mu_{M_j \to p_i}^{(n_f)}(p_i) \right\}. \tag{11}$$

Equation (11) returns one of the possible values for the local parameter $p_i$ of the communication node i that corresponds to the minimum value in the table resulting from the summation of the final summary messages.

FIG. 6 is a more detailed embodiment of the flow chart of FIG. 3 according to another embodiment of the present disclosure. This embodiment is similar to the embodiment of FIG. 4 but where steps 210 and 212 of FIG. 4 are performed only if the predetermined stopping criterion, or criteria, is not satisfied. Again, while this process is described with respect to one of the communication nodes 12, it should be understood that this process is performed by each of the communication nodes 12 in the cellular communication network 10 in order to determine the optimal values for the local parameters of the communication nodes 12 in a distributed, coordinated manner that optimizes the global performance metric of the cellular communication network 10.

First, the communication node 12 (which for the remaining discussion of FIG. 6 is referred to as communication node i) performs an initialization process (step 400). At this point, an iteration index (n) is set to zero (i.e., n=0). During the initialization process, the communication node i initializes an aggregate message of the communication node i ($\mu_{p_i \to M_k}^{(0)}(p_i)$) to an initial value, and sends the aggregate message to the neighboring communication nodes $k \in \mathcal{N}_i$. For example, the communication node i may set $\mu_{p_i \to M_k}^{(0)}(p_i)=0$ for some value of $p_i$ in $\mathcal{P}_i$ and set $\mu_{p_i \to M_k}^{(0)}(p_i)=\epsilon$ for all other values of $p_i$ in $\mathcal{P}_i$, for all $k \in \mathcal{A}_i$, to indicate an initial preference of the communication node i, where $\epsilon$ denotes a small positive number such as 0.01. Next, the communication node i receives the aggregate messages from all of the neighboring communication nodes $k \in \mathcal{N}_i$ of the communication node i (step 402). Specifically, the aggregate messages are received from the variable nodes $v(p_k)$ of all of the neighboring communication nodes $k \in \mathcal{N}_i$ of the communication node i.

The communication node i, and specifically the factor node of the communication node i, then computes summary messages for each of the neighboring communication nodes $k \in \mathcal{N}_i$ of the communication node i and a summary message for the communication node i itself (step 404). More specifically, the summary messages are computed based on Equation (2) above. Specifically, the summary messages are computed based on:

$$\mu_{M_i \to p_k}^{(n+1)}(p_k) = \tag{12}$$

$$\min_{\mathbf{p}_{\mathcal{A}_i \setminus \{k\}}} \left\{ w_i M_i(\mathbf{p}_{\mathcal{A}_i}) + \mu_{p_i \to M_i}^{(n)}(p_i) + \sum_{j \in N_i \setminus \{k\}} \mu_{p_j \to M_i}^{(n)}(p_j) \right\} =$$

$$\min_{\mathbf{p}_{\mathcal{A}_i \setminus \{k\}}} \left\{ w_i M_i(\mathbf{p}_{\mathcal{A}_i}) + \mu_{p_i \to M_i}^{(n)}(p_i) - \mu_{p_k \to M_i}^{(n)}(p_k) + \sum_{j \in N_i} \mu_{p_j \to M_i}^{(n)}(p_j) \right\}$$

for each neighboring communication node $k \in \mathcal{A}_i$, by hypothesizing each possible value of $p_k$ in $\mathcal{P}_k$ and finding the best corresponding set of parameters $\mathbf{P}_{\mathcal{A}_i \setminus \{k\}}$ that minimizes the quantity in brackets above.

More specifically, in order to understand Equation (12), one must first understand that $M_i(\mathbf{P}_{\mathcal{A}_i})$ is essentially a multi-dimensional table that includes a value for the local performance metric for the communication node i for each possible combination of values for vector $\mathbf{P}_{\mathcal{A}_i}$, which is a vector of the local performance metrics of the inclusive list of neighboring communication nodes for the communication node i. Then, in order to compute the summary message to be sent to communication node k, the communication node i first hypothesizes that $p_k$ is one of the possible values in $\mathcal{P}_k$. Then, using the hypothesized value for $p_k$, $M_i(\mathbf{P}_{\mathcal{A}_i})$ becomes a multi-dimensional table for all possible combinations of values for $\mathbf{P}_{\mathcal{A}_i}$ with $p_k$ equal to the hypothesized value for $p_k$. Each value in the multi-dimensional table is then summed with a discrete value that is equal to a summation of the values from the aggregate message $\mu_{p_j \to M_i}^{(n)}(p_j)$ for $j \in \mathcal{A}_i \dagger \{k\}$ for the hypothesized value for $p_k$. A minimum value from the resulting multi-dimensional table is then determined. A value in the summary message $\mu_{M_i \to p_k}^{(n+1)}(p_k)$ corresponding to the hypothesized value for $p_k$ is then set equal to the minimum value determined for the hypothesized value for $p_k$. This process is repeated for each of the other possible values $\mathcal{P}_k$ for $p_k$. In this manner, the summary messages $\mu_{M_i \to p_k}^{(n+1)}(p_k)$ are computed for all of the communication nodes $k \in \mathcal{A}_i$. Note that to reduce computational complexity, the minimization operation in step 404 can be computed through a standard alternating-coordinate optimization technique, i.e., starting with an arbitrary choice of $\mathbf{P}_{\mathcal{A}_i \setminus \{k\}}$ and optimizing each parameter in $\mathbf{P}_{\mathcal{A}_i \setminus \{k\}}$ one at a time while holding the other parameters fixed.

The communication node i then sends each of the summary messages $\mu_{M_i \to p_k}^{(n+1)}(p_k)$ for $k \in \mathcal{N}_i$ (i.e., the summary messages for the proper neighboring communication nodes of the communication node i) to the corresponding neighboring communication node k (step 406). The communication node i also receives similarly computed summary messages from the proper neighboring communication nodes of the communication node i (step 408).

In this embodiment, the communication node i next determines whether the predefined stopping criteria has been satisfied (step 410). If not, the communication node i then generates aggregate messages $\mu_{p_i \to M_k}^{(n+1)}(p_i)$ for $k \in \mathcal{N}_i$ (i.e., for each of the proper neighboring communication nodes of the communication node i) as well as an aggregate message $\mu_{p_i \to M_k}^{(n+1)}(p_i)$ for k={i} (i.e., for the communication node i itself) (step 412). More specifically, the communication node i generates the aggregate messages according to Equation (3) above. More specifically, the communication node i generates the aggregate messages based on:

$$\mu_{p_i \to M_k}^{(n+1)}(p_i) = \mu_{M_i \to p_i}^{(n+1)}(p_i) + \sum_{j \in N_i \setminus \{k\}} \mu_{M_j \to p_i}^{(n+1)}(p_i) = \qquad (13)$$

$$\mu_{M_i \to p_i}^{(n+1)}(p_i) - \mu_{M_k \to p_i}^{(n+1)}(p_i) + \sum_{j \in N_i} \mu_{M_j \to p_i}^{(n+1)}(p_i)$$

for each neighboring communication node $k \in \mathcal{A}_i$ by summing the summary messages $\{\mu_{M_j \to p_i}^{(n+1)}(p_i)\}_{j \in \mathcal{N}_i}$.

The communication node i then sends each of the aggregate messages $\mu_{p_i \to M_k}^{(n+1)}(p_i)$ to the corresponding neighboring communication node k (step 414). The iteration index is incremented (step 416), and the process returns to step 402 and is repeated. Returning to step 410, if the predefined stopping criteria has been satisfied, the communication node i computes an optimal value $p_i^*$ for the local parameter of the communication node i based on the summary messages from the final iteration (i.e., the final summary messages) (step 418). More specifically, the optimal value $p_i^*$ for the local parameter of the communication node i is computed based on:

$$p_i^* = \operatorname*{argmin}_{p_i} \left\{ \sum_{j \in \mathcal{A}_i} \mu_{M_j \to p_i}^{(n_f)}(p_i) \right\}. \qquad (14)$$

Equation (14) returns one of the possible values for the local parameter $p_i$ of the communication node i that corresponds to the minimum value in the table resulting from the summation of the final summary messages. Notably, Equation (14) shows that the computation of $p_i^*$ does not directly depend on the aggregate messages generated in step 412. Therefore, steps 412 and 414 do not need to be performed for the last iteration.

While numerous applications of the systems and methods described herein will be appreciated by those of ordinary skill in the art, the following is a description of several exemplary applications. As a first example, each local parameter $p_i$ may represent an index to a frequency band out of a set $\mathcal{P}_i$ of all possible frequency bands for the communication node i, and the global performance metric is defined to solve the frequency reuse planning problem. More specifically, the global performance metric is defined such that the min-sum algorithm minimizes the number of "collisions" in using the same frequency band in adjacent cells or base stations. In this case, the local performance metric may be chosen as:

$$M_i(p_{\mathcal{A}_i}) = \sum_{j \in N_i} \delta(p_i, p_j),$$

where $\delta(x, y) = 1$ if $x = y$, and otherwise $\delta(x, y) = 0$. Another possible choice of the local performance metric that often leads to fast convergence is:

$$M_i(p_{\mathcal{A}_i}) = \sum_{j \in N_i} \delta(p_i, p_j) + \sum_{\substack{k,l \in N_i \\ k \in (\cup_{m \in N_l} N_m) \setminus \mathcal{A}_k \\ l \in (\cup_{m \in N_k} N_m) \setminus \mathcal{A}_l}} (1 - \delta(p_k, p_l)),$$

where the second term encourages second-tier neighboring communication nodes to select the same frequency band. Yet another possible choice of the local performance metric is $$M_i(p_{\mathcal{A}_i}) = \frac{1}{2} \sum_{\substack{j,k \in \mathcal{A}_i \\ k \in N_j}} \delta(p_k, p_j)$$

which counts all "collisions" between neighboring communication nodes within the neighborhood defined by $\mathcal{A}_i$.

As a second example, each parameter $p_i$ may represent an index to a reference signal (RS) out of a set $\mathcal{P}_i$ of all possible RSs for the communication node i. Here, the communication nodes 12 are access nodes in the cellular communication network 10, and the goal is to find the best combinations of RSs for all access nodes so that the sum of maximum cross-correlation between RSs in adjacent cells or access nodes is minimized. In this case the local performance metric may be chosen as:

$$M_i(p_{\mathcal{A}_i}) = \sum_{j \in N_i} \max_{|\tau| \leq L_{max}} |R_{s(p_i)s(p_j)}(\tau)|,$$

where $s(p_i)$ denotes the RS indexed by $p_i$, $L_{max}$ denotes the maximum correlation lag of interest which may be determined by the maximum allowable channel delay spread in the network, and $$R_{s_1 s_2}(\tau) \equiv \frac{1}{N_s} \sum_m s_1(m) s_2^*(m - \tau)$$

denotes the cross-correlation function among RS $s_1$ and RS $s_2$, where $N_s$ is the length of each RS. Note that if the set $\mathcal{P}_i$ contains a sufficient number of orthogonal RSs, the minimum achievable local performance metric is zero for all access nodes. One example of a choice for $s(p_i)$ is the Zadoff-Chu sequences given by:

$$s_n(p_i) = \begin{cases} e^{\frac{i\pi}{N_s}\alpha_i(n+1-\beta_i)(n-\beta_i)} & N_s \text{ odd} \\ e^{\frac{i\pi}{N_s}\alpha_i(n-\beta_i)^2} & N_s \text{ even} \end{cases}$$

where $p_i = [\alpha_i, \beta_i]^T$ and $s(p_i) \equiv [s_0(p_i), s_1(p_i), \ldots, s_{N_s-1}(p_i)]^T$. The parameter $\alpha_i$ generates the $\alpha_i$-th root sequence, whereas $\beta_i$ generates cyclically shifted versions of such a $\alpha_i$-th root sequence. This kind of sequence exhibits the property that cyclically versions of itself (i.e. $\beta \neq 0$) are orthogonal to one another. To maximize the number of possible sequences with low cross-correlation among each other (i.e. $\alpha_i \neq \alpha_3$), $N_s$ may be chosen as a prime number, e.g., those slightly less than an integral power of 2, such as 31.

As a third example, each parameter $p_i$ represent an index to power levels out of a set $\mathcal{P}_i$ of all possible power levels for the communication node i. The goal here is to find the best combinations of power levels for all communication nodes 12 (e.g., access nodes) so that the negative sum data throughput is minimized (or equivalently, the sum data throughput is maximized). In this case the local performance metric may be chosen as:

$$M_i(p_{\mathcal{A}_i}) = \log_2\left(1 + \frac{p_i}{\sum_{j \in N_i} p_j + \sigma_i^2}\right),$$

where $\sigma_i^2$ denotes the noise variance observed by the UE served by the i-th access node.

As a fourth example, the communication nodes 12 are base stations in a cellular communication network, where the base stations and/or mobile terminals served by the base stations utilize multiple antennas for transmission and precoding is utilized to provide either antenna selection or beam forming. Note that while a cellular communication network is referenced in this example, this example may also be used to provide precoder selection in other types of wireless communication systems. For antenna selection, precoding is used to select which of the multiple antennas is (are) to be utilized for transmission for each resource block of the transmitted signal. For beam selection, precoding is used to select a direction in which the transmitted signal is to be transmitted. In general, in this example, each local parameter $p_i$ represents a precoding matrix from a set of all possible precoding matrices (i.e., a precoder selection codebook) that is to be used for precoding a particular transmit resource in either a downlink signal from a base station i to a particular mobile terminal served by the base station i or an uplink signal from a particular mobile terminal served by the base station i to the base station i. For this discussion, the cellular communication network is a Long Term Evolution (LTE) cellular communication network, and the transmit resource is a resource block.

More specifically, in one embodiment of this example, each local parameter $p_i$ represents a precoding matrix for a particular resource block in a downlink signal from the base station i to a particular mobile terminal served by the base station i. In this embodiment, a value assigned to each local parameter $p_i$ is an index to a precoding matrix in a predetermined set of precoding matrices $S_i$ for the base station i. Notably, the set of precoding matrices $S_i$ may be the same for all base stations, but may alternatively vary among the base stations. The predetermined set of precoding matrices $S_i$ is a predetermined set of all possible precoding matrices for the base station i and may be defined as:

$$S_i = \left\{ \begin{bmatrix} w(1)_{1,1} & \cdots & w(1)_{1,N_{ST}} \\ \vdots & \ddots & \vdots \\ w(1)_{N_{ANT},1} & \cdots & w(1)_{N_{ANT},N_{ST}} \end{bmatrix}, \ldots, \begin{bmatrix} w(N_{PM})_{1,1} & \cdots & w(N_{PM})_{1,N_{ST}} \\ \vdots & \ddots & \vdots \\ w(N_{PM})_{N_{ANT},1} & \cdots & w(N_{PM})_{N_{ANT},N_{ST}} \end{bmatrix} \right\}$$

where $N_{ST}$ is a number of streams transmitted by the base station i in the downlink and is an integer greater than or equal to 1, $N_{ANT}$ is a number of antennas with which the base station i is equipped and is an integer greater than or equal to 2, and $N_{PM}$ is a number of precoding matrices in the set of precoding matrices $S_1$ and is greater than or equal to 2. In each precoding matrix, each row corresponds to a different antenna and each column corresponds to a different stream. Thus, the first precoding matrix (i.e., the precoding matrix indexed by an index of 1) is:

$$\begin{bmatrix} w(1)_{1,1} & \cdots & w(1)_{1,N_{ST}} \\ \vdots & \ddots & \vdots \\ w(1)_{N_{ANT},1} & \cdots & w(1)_{N_{ANT},N_{ST}} \end{bmatrix},$$

where $w(1)_{1,1}$ is a weight assigned to antenna 1 for stream 1 in the first precoding matrix, $w(1)_{N_{ANT},1}$ is a weight assigned to antenna $N_{ANT}$ for stream 1 in the first precoding matrix, $w(1)_{1,N_{ST}}$ is a weight assigned to antenna 1 for stream $N_{ST}$ in the first precoding matrix, and $w(1)_{N_{ANT},N_{ST}}$ is a weight assigned to antenna $N_{ANT}$ for stream $N_{ST}$ in the first precoding matrix. Similarly, the last precoding matrix (i.e., the precoding matrix indexed by an index of $N_{PM}$) is:

$$\begin{bmatrix} w(N_{PM})_{1,1} & \cdots & w(N_{PM})_{1,N_{ST}} \\ \vdots & \ddots & \vdots \\ w(N_{PM})_{N_{ANT},1} & \cdots & w(N_{PM})_{N_{ANT},N_{ST}} \end{bmatrix},$$

where $w(N_{PM})_{1,1}$ is a weight assigned to antenna 1 for stream 1 in the last precoding matrix, $w(N_{PM})_{N_{ANT},1}$ is a weight assigned to antenna $N_{ANT}$ for stream 1 in the last precoding matrix, $w(N_{PM})_{1,N_{ST}}$ is a weight assigned to antenna 1 for stream $N_{ST}$ in the last precoding matrix, and $w(N_{PM})_{N_{ANT},N_{ST}}$ is a weight assigned to antenna $N_{ANT}$ for stream $N_{ST}$ in the last precoding matrix. Notably, for antenna selection, the values of the weights w are either 0 or 1 such that the corresponding antennas are either on or off. Conversely, for beam selection, the values of the weights w are continuous, complex values. More specifically, for each precoding matrix predefined for beam selection, the weights w assigned to the antennas are complex values that result in transmission in a particular direction. For example, for a sector providing coverage over a 120 degree range, each of the precoding matrices may correspond to a different direction within that 120 degree range.

In this embodiment, the local performance metric represents the negative of data throughput of the cell corresponding to the base station i measured by:

$$M_i(p_{\mathcal{A}_i}) = -\log\det\left( I + \left( R_i + \sum_{j \in N_i} H_{ji} P(p_j) P(p_j)^H H_{ji}^H \right)^{-1} H_{ii} P(p_i) P(p_i)^H H_{ii}^H \right)$$

where I denotes an identity matrix, $R_i$ denotes the covariance matrix of the noise-plus-uncontrolled-interference experienced by the mobile terminal served by the base-station i in the downlink, $H_{ji}$ denotes a Multiple-Input-Multiple-Output (MIMO) channel response from neighboring base station j to the mobile terminal served by the base-station i in the downlink, $P(p_j)$ denotes the precoding matrix from a set of precoding matrices $S_j$ for the neighboring base station j specified, or indexed, by the parameter $p_j$ for the neighboring base station j, $H_{ii}$ denotes a MIMO channel response from the base station i to the mobile terminal served by the base station i in the downlink, and $P(p_i)$ denotes the precoding matrix from the set of precoding matrices $S_i$ specified, or indexed, by the parameter $p_i$ of the base station i.

Examples of the set of precoding matrices $S_i$ may be an LTE precoder codebook, a set of Discrete Fourier Transform (DFT) based fixed beamforming weights, and an antenna selection codebook. One example of the set of precoding matrices $S_i$ where the set of precoding matrices $S_i$ is an antenna selection codebook is given by:

$$S_i = \left\{ \begin{bmatrix} 1 & 0 \\ 0 & 1 \\ 0 & 0 \end{bmatrix} \begin{bmatrix} 1 & 0 \\ 0 & 0 \\ 0 & 1 \end{bmatrix} \begin{bmatrix} 0 & 0 \\ 1 & 0 \\ 0 & 1 \end{bmatrix} \right\}$$

where each precoding matrix in the set of precoding matrices $S_i$ is a particular precoding matrix $P(p_i)$ indexed by the parameter $p_i$. In this particular example, each precoding matrix selects two antennas out of three. Note that the examples above are non-limiting. The details of the precoding matrices will vary depending on the particular implementation.

In this embodiment, the global performance metric $M(\mathbf{p})$ is simply a negative of the total downlink data throughput in the cellular communication network. Hence, in this embodiment, the graph-based distributed parameter coordination process described above with respect to, for example, FIGS. 3 through 5 is utilized by the base stations to negotiate their choices of downlink precoding matrices with their respective neighbors so that the total downlink data throughput in the cellular communication network is maximized.

In another embodiment of this fourth example, each local parameter $p_i$ represents a precoding matrix for a particular resource block in an uplink signal from a mobile terminal served by the base station i to the base station i. In this embodiment, a value assigned to each local parameter $p_i$ is an index to a precoding matrix in a predetermined set of precoding matrices $S_i$ for the mobile terminal served by the base station i. Notably, the set of precoding matrices $S_i$ may be the same for all mobile terminals served by the base station i, but may alternatively vary among the mobile terminals. Similarly, the set of precoding matrices $S_i$ may be the same for all mobile terminals served by all of the base stations, but may alternatively vary among the mobile terminals served by different base stations. The predetermined set of precoding matrices $S_i$ is a predetermined set of all possible precoding matrices for the uplink to the base station i (i.e., a predetermined set of all possible precoding matrices for precoding at the mobile terminal for the uplink to the base station i) and may be defined as:

$$S_i = \left\{ \begin{bmatrix} w(1)_{1,1} & \cdots & w(1)_{1,N_{ST}} \\ \vdots & \ddots & \vdots \\ w(1)_{N_{ANT},1} & \cdots & w(1)_{N_{ANT},N_{ST}} \end{bmatrix}, \ldots, \begin{bmatrix} w(N_{PM})_{1,1} & \cdots & w(N_{PM})_{1,N_{ST}} \\ \vdots & \ddots & \vdots \\ w(N_{PM})_{N_{ANT},1} & \cdots & w(N_{PM})_{N_{ANT},N_{ST}} \end{bmatrix} \right\}$$

where for the uplink $N_{ST}$ is a number of streams transmitted by the mobile terminal in the uplink to the base station i and is an integer greater than or equal to 1, $N_{ANT}$ is a number of antennas with which the mobile terminal served by the base station i is equipped which is an integer greater than or equal to 2, and $N_{PM}$ is a number of precoding matrices in the set of precoding matrices $S_i$ and is greater than or equal to 2. As discussed above, in each precoding matrix, each row corresponds to a different antenna and each column corresponds to a different stream. Examples of the set of precoding matrices $S_i$ may be an LTE precoder codebook, a set of DFT-based fixed beamforming weights, and an antenna selection codebook.

In this embodiment, the local performance metric represents the negative of data throughput of the cell corresponding to the base station i measured by:

$$M_i(p_{\mathcal{A}_i}) = -\log\det\left( I + \left( R_i + \sum_{j \in N_i} H_{ji} P(p_j) P(p_j)^H H_{ji}^H \right)^{-1} H_{ii} P(p_i) P(p_i)^H H_{ii}^H \right)$$

where, for the uplink embodiment, I denotes an identity matrix, $R_i$ denotes the covariance matrix of the noise-plus-uncontrolled-interference experienced by the base station i in the uplink from the mobile terminal, $H_{ji}$ denotes a MIMO channel response from a mobile terminal served by the neighboring base station j scheduled to use the same resource block to the base station i in the uplink, $P(p_j)$ denotes the precoding matrix from a set of precoding matrices $S_j$ for the mobile terminal served by the neighboring base station j specified, or indexed, by the parameter $p_j$ for the neighboring base station j, $H_{ii}$ denotes a MIMO channel response from mobile terminal served by the base station i to the base-station i in the uplink, and $P(p_i)$ denotes the precoding matrix from the set of precoding matrices $S_i$ specified, or indexed, by the parameter $p_i$ of the base station i.

In this embodiment, the global performance metric $M(p)$ is simply a negative of the total uplink data throughput in the cellular communication network. Hence, in this embodiment, the graph-based distributed parameter coordination process described above with respect to, for example, FIGS. 4 and 5 is utilized by the base stations to negotiate their choices of downlink precoding matrices with their respective neighbors so that the total uplink data throughput in the cellular communication network is maximized.

It should be noted that the processes of FIGS. 3 through 6 are scalable to arbitrarily large networks since their computational complexity and communication overhead increase only with the maximum number of neighboring communication nodes instead of the total number of communication nodes 12 in the cellular communication network 10. Thus, the processes of FIGS. 3 through 6 are general, scalable processes for coordinating local parameters throughout the cellular communication network 10 in a distributed manner and have a wide range of potential applications in wireless communications including device-to-device communications and self-organizing networks.

FIG. 7 is a block diagram of one of the communication nodes 12 according to one embodiment of the present disclosure. This discussion is equally applicable to all of the communication nodes 12. The communication node 12 includes one or more transceiver subsystems 14 and a processing subsystem 16. At least one of the transceiver subsystems 14 generally includes analog and, in some embodiments, digital components for sending and receiving messages (e.g., summary and aggregate messages) to and from the other communication nodes 12. In particular embodiments, the transceiver subsystems 14 may represent or include radio-frequency (RF) transceivers, or separate RF transmitters and receivers, capable of transmitting such messages and/or other suitable information wirelessly to other components.

The processing subsystem 16 generally operates to receive and send messages via the one or more transceiver subsystems 14 and to generate and process messages as described herein. Specifically, the processing subsystem 16 operates to compute summary messages and aggregate messages as described herein.

In particular embodiments, the processing subsystem 16 may comprise, for example, one or several general-purpose or special-purpose microprocessors or other microcontrollers programmed with suitable software and/or firmware to carry out some or all of the functionality of the communication node 12 described herein. In addition or alternatively, the processing subsystem 16 may comprise various digital hardware blocks (e.g., one or more Application Specific Integrated Circuits (ASICs), one or more off-the-shelf digital and analog hardware components, or a combination thereof) configured to carry out some or all of the functionality of the communication node 12 described herein. Additionally, in particular embodiments, the above described functionality of the communication node 12 may be implemented, in whole or in part, by the processing subsystem 16 executing software or other instructions stored on a non-transitory computer-readable medium, such as Random Access Memory (RAM), Read Only Memory (ROM), a magnetic storage device, an optical storage device, or any other suitable type of data storage components.

The following acronyms are used throughout this disclosure.

ASIC Application Specific Integrated Circuit
DFT Discrete Fourier Transform
eNodeB Enhanced Node B
GSM Global System for Mobile Communications
LTE Long Term Evolution
MIMO Multiple-Input-Multiple-Output
RAM Random Access Memory
RF Radio Frequency
ROM Read Only Memory
RS Reference Signal
UE User Equipment Those skilled in the art will recognize improvements and modifications to the preferred embodiments of the present disclosure. All such improvements and modifications are considered within the scope of the concepts disclosed herein and the claims that follow.

What is claimed is:

1. A method of operation of a base station in a cellular communication network, comprising:
   iteratively exchanging messages with a plurality of neighboring base stations in the cellular communication network based on a factor graph until one or more predefined stopping criteria are satisfied, the factor graph modeling discrete local parameters to be coordinated among base stations in the cellular communication network and corresponding local performance metrics of the base stations, wherein the discrete local parameters represent precoding matrices to be utilized for one of a group consisting of downlinks from the base stations to mobile terminals served by the base stations and uplinks from the mobile terminals served by the base stations to the base stations; and
   computing an optimal value for the local parameter of the base station based on results of iteratively exchanging the messages with the plurality of neighboring base stations.

2. The method of claim 1 wherein the precoding matrices are antenna selection matrices.

3. The method of claim 1 wherein the precoding matrices are beam selection matrices.

4. The method of claim 1 wherein the discrete local parameters represent precoding matrices to be utilized for downlinks from the base stations to the mobile terminals served by the base stations.

5. The method of claim 4 wherein the local parameter of the base station represents a precoding matrix from a predefined set of precoding matrices for the base station, and the optimal value for the local parameter of the base station represents an optimal precoding matrix from the predefined set of precoding matrices.

6. The method of claim 1 wherein the discrete local parameters represent precoding matrices to be utilized for uplinks from the mobile terminals served by the base stations to the base stations.

7. The method of claim 6 wherein the local parameter of the base station represents a precoding matrix from a predefined set of precoding matrices for the mobile terminal served by the base station, and the optimal value for the local parameter of the base station represents an optimal precoding matrix from the predefined set of precoding matrices.

8. The method of claim 1 wherein computing the optimal value for the local parameter of the base station comprises computing the optimal value for the local parameter of the base station such that the optimal value for the local parameter and corresponding optimal values determined for local parameters of other communication nodes in the cellular communication network together optimize a global performance metric for the cellular communication network, wherein the global performance metric for the cellular communication network is a negative of a total data throughput in the cellular communication network.

9. The method of claim 8 wherein iteratively exchanging the messages with the plurality of neighboring base stations comprises iteratively exchanging the messages with the plurality of neighboring base stations according to a min-sum algorithm that minimizes the global performance metric for the cellular communication network.

10. The method of claim 9 wherein iteratively exchanging the messages comprises iteratively exchanging summary messages and aggregate messages according to the min-sum algorithm that minimizes the global performance metric for the cellular communication network.

11. The method of claim 10 wherein iteratively exchanging the summary messages and the aggregate messages comprises:
    computing initial summary messages for the plurality of neighboring base stations and the base station based on initialized aggregate messages for the plurality of neighboring base stations and the base station according to the min-sum algorithm;
    sending each of the initial summary messages for the plurality of neighboring base stations to a corresponding one of the plurality of neighboring base stations;
    receiving initial summary messages from the plurality of neighboring base stations;
    generating aggregate messages for the plurality of neighboring base stations and an aggregate message for the base station based on the initial summary messages received from the plurality of neighboring base stations; and
    sending each of the aggregate messages for the plurality of neighboring base stations to a corresponding one of the plurality of neighboring base stations.

12. The method of claim 11 wherein iteratively exchanging the summary messages and the aggregate messages further comprises performing a plurality of iterations of:
    receiving aggregate messages from the plurality of neighboring base stations;
    computing summary messages for the plurality of neighboring base stations and a summary message for the base station based on the aggregate messages received from the plurality of neighboring base stations according to the min-sum algorithm;

sending each of the summary messages for the plurality of neighboring base stations to a corresponding one of the plurality of neighboring base stations;

receiving summary messages from the plurality of neighboring base stations;

generating aggregate messages for the plurality of neighboring base stations and an aggregate message for the base station based on the summary messages received from the plurality of neighboring base stations; and sending each of the aggregate messages for the plurality of neighboring base stations to a corresponding one of the plurality of neighboring base stations;

wherein performing the plurality of iterations comprises performing the plurality of iterations until the one or more predefined stopping criteria are satisfied.

13. The method of claim 12 wherein the predefined stopping criteria is a predefined maximum number of iterations.

14. The method of claim 10 wherein iteratively exchanging the summary messages and the aggregate messages comprises:

computing initial summary messages for the plurality of neighboring base stations and the base station based on initialized aggregate messages for the plurality of neighboring base stations and the base station according to the min-sum algorithm;

sending each of the initial summary messages for the plurality of neighboring base stations to a corresponding one of the plurality of neighboring base stations; and receiving initial summary messages from the plurality of neighboring base stations.

15. The method of claim 14 wherein iteratively exchanging the summary messages and the aggregate messages further comprises:

determining that the one or more predefined stopping criteria are not satisfied; and in response to determining that the one or more predefined stopping criteria are not satisfied:

generating aggregate messages for the plurality of neighboring base stations and an aggregate message for the base station based on the initial summary messages received from the plurality of neighboring base stations; and sending each of the aggregate messages for the plurality of neighboring base stations to a corresponding one of the plurality of neighboring base stations.

16. The method of claim 15 wherein iteratively exchanging the summary messages and the aggregate messages further comprises performing a plurality of iterations of:

receiving aggregate messages from the plurality of neighboring base stations;

computing summary messages for the plurality of neighboring base stations and a summary message for the base station based on the aggregate messages received from the plurality of neighboring base stations according to the min-sum algorithm;

sending each of the summary messages for the plurality of neighboring base stations to a corresponding one of the plurality of neighboring base stations;

receiving summary messages from the plurality of neighboring base stations;

determining whether the one or more predefined stopping criteria are satisfied; and if the one or more predefined stopping criteria are not satisfied:

generating aggregate messages for the plurality of neighboring base stations and an aggregate message for the base station based on the summary messages received from the plurality of neighboring base stations; and sending each of the aggregate messages for the plurality of neighboring base stations to a corresponding one of the plurality of neighboring base stations;

wherein performing the plurality of iterations comprises performing the plurality of iterations until the one or more predefined stopping criteria are satisfied.

17. The method of claim 16 wherein the one or more predefined stopping criteria comprise a predefined maximum number of iterations.

18. The method of claim 10 wherein iteratively exchanging the summary messages and the aggregate messages comprises:

initializing summary messages for the plurality of neighboring base stations and a summary message for the base station;

sending each of the initial summary messages for the plurality of neighboring base stations to a corresponding one of the plurality of neighboring base stations; and receiving summary messages from the plurality of neighboring base stations.

19. The method of claim 18 wherein iteratively exchanging the summary messages and the aggregate messages further comprises performing a plurality of iterations of:

generating aggregate messages for the plurality of neighboring base stations and an aggregate message for the base station based on the summary messages received from the plurality of neighboring base stations;

sending each of the aggregate messages for the plurality of neighboring base stations to a corresponding one of the plurality of neighboring base stations;

receiving aggregate messages from the plurality of neighboring base stations;

computing summary messages for the plurality of neighboring base stations and a summary message for the base station based on the aggregate messages received from the plurality of neighboring base stations according to the min-sum algorithm;

sending each of the summary messages for the plurality of neighboring base stations to a corresponding one of the plurality of neighboring base stations; and receiving summary messages from the plurality of neighboring base stations;

wherein performing the plurality of iterations comprises performing the plurality of iterations until the one or more predefined stopping criteria are satisfied.

20. The method of claim 19 wherein computing the summary messages for the plurality of neighboring base stations and the summary message for the base station comprises, for each summary message:

for each possible value of a plurality of possible values for the local parameter for the base station:

determining a minimum value of a sum of a weighted local performance metric for the base station and a summation of the aggregate messages received from the plurality of neighboring base stations excluding the corresponding one of the plurality of neighboring base stations for which the summary message is computed across all combinations of possible values for the local parameters for the plurality of neighboring base stations and the base station.

21. The method of claim 20 wherein generating the aggregate messages for the plurality of neighboring base stations and the aggregate message for the base station comprises, for each aggregate message, summing the summary messages received from the plurality of neighboring base stations and the summary message computed for the base station excluding the summary message from the corresponding one of the plurality of neighboring base stations and the base station for which the aggregate message is generated.

22. The method of claim 21 wherein computing the summary messages for the plurality of neighboring base stations and the summary message for the base station comprises, for each summary message, computing the summary message according to the following equation:

$$\mu_{M_i \to p_k}(p_k) = \min_{p_{\mathcal{A}_i \setminus \{k\}}} \left\{ w_i M_i(p_{\mathcal{A}_i}) + \sum_{j \in \mathcal{A}_i \setminus \{k\}} \mu_{p_j \to M_i}(p_j) \right\},$$

where the base station is an i-th base station in the cellular communication network; $\mu_{M_i \to p_k}(p_k)$ is the summary message from the i-th base station to a k-th base station among an inclusive list of neighboring base stations, $\mathcal{A}_i$, for the i-th base station that includes both the plurality of neighboring base stations and the i-th base station; $w_i$ is a predefined weight assigned to the i-th base station; $M_i$ is the local performance metric of the i-th base station that is a function of a vector comprising the local parameters of all of the base stations in the inclusive list of neighboring base stations for the i-th base station; and $\mu_{p_j \to M_i}(p_j)$ is the aggregate message from a j-th base station to the i-th base station where the j-th base station is one of the base stations in the inclusive list of neighboring base stations for the i-th base station.

23. The method of claim 22 wherein the discrete local parameters represent precoding matrices to be utilized for downlink signals from the base stations to mobile terminals served by the base stations in corresponding resource blocks of the downlink signals, and for each base station i of the base stations, the local performance metric of the base station i is defined as:

$$M_i(p_{\mathcal{A}_i}) = -\log\det\left( I + \left( R_i + \sum_{j \in N_i} H_{ji} P(p_j) P(p_j)^H H_{ji}^H \right)^{-1} H_{ii} P(p_i) P(p_i)^H H_{ii}^H \right)$$

where I denotes an identity matrix, $R_i$ denotes a covariance matrix of a noise-plus-uncontrolled-interference experienced by the mobile terminal served by the base station i, $H_{ji}$ denotes a MIMO channel response from a neighboring base-station j to the mobile terminal served by the base station i, $P(p_j)$ denotes a precoding matrix from a predefined set of precoding matrices $S_j$ for the neighboring base station j specified by the local parameter $p_j$ of the neighboring base station j, $H_{ii}$ denotes a MIMO channel response from the base station i to the mobile terminal served by the base station i, and $P(p_i)$ denotes a precoding matrix from a predefined set of precoding matrices $S_i$ for the base station i specified by the local parameter $p_i$ of the base station i.

24. The method of claim 22 wherein the discrete local parameters represent precoding matrices to be utilized for uplink signals from mobile terminals served by the base stations to the base stations in corresponding resource blocks of the uplink signals, and for each base station i of the base stations, the local performance metric of the base station i is defined as:

$$M_i(p_{\mathcal{A}_i}) = -\log\det\left( I + \left( R_i + \sum_{j \in N_i} H_{ji} P(p_j) P(p_j)^H H_{ji}^H \right)^{-1} H_{ii} P(p_i) P(p_i)^H H_{ii}^H \right)$$

where I denotes an identity matrix, $R_i$ denotes a covariance matrix of the noise-plus-uncontrolled-interference experienced by the base-station i in the uplink signal from the mobile terminal served by the base station i, $H_{ji}$ denotes a MIMO channel response from the mobile terminal served by a neighboring base-station j to the base station i, $P(p_j)$ denotes a precoding matrix from a set of precoding matrices $S_j$ for the mobile terminal served by the neighboring base station j specified by the local parameter $p_j$ for the neighboring base station j, $H_{ii}$ denotes a MIMO channel response from the mobile terminal served by the base station i to the base station i, and $P(p_i)$ denotes a precoding matrix from a predefined set of precoding matrices $S_i$ for the base station i specified by the local parameter $p_i$ of the base station i.

25. The method of claim 22 wherein computing the aggregate messages for the plurality of neighboring base stations and the aggregate message for the base station comprises, for each aggregate message, generating the aggregate message according to the following equation:

$$\mu_{p_i \to M_k}(p_i) = \sum_{j \in \mathcal{A}_i \setminus \{k\}} \mu_{M_j \to p_i}(p_i),$$

where the base station is an i-th base station in the cellular communication network; $\mu_{p_i \to M_k}(p_i)$ is the aggregate message from the i-th base station to a k-th base station among an inclusive list of neighboring base stations, $\mathcal{A}_i$, for the i-th base station that includes both the plurality of neighboring base stations and the i-th base station; and $\mu_{M_j \to p_i}(p_i)$ is the summary message to the i-th base station from a j-th base station the inclusive list of neighboring base stations, $\mathcal{A}_i$, for the i-th base station.

26. The method of claim 25 wherein computing the optimal value for the local parameter of the base stations comprises:
   summing the summary messages received by the base station in a final iteration of the plurality of iterations to provide summation results; and
   determining that the possible value of the plurality of possible values for the local parameter for the base station that corresponds to a minimum value in the summation results is the optimal value for the local parameter of the base station.

27. The method of claim 26 wherein summing the summary messages received by the base station in the final iteration of the plurality of iterations to provide the summation results and determining that the possible value of the plurality of possible values for the local parameter for the base station that corresponds to the minimum value in the summation results is the optimal value for the local parameter of the base station are performed according to the following equation:

$$p_i^* = \arg\min_{p_i} \left\{ \sum_{j \in \mathcal{A}_i} \mu_{M_j \to p_i}^{(n_f)}(p_i) \right\},$$

where $p_i^*$ is the optimal value for the local parameter of the base station and $n_f$ denotes the final iteration of the plurality of iterations.

28. A base station in a cellular communication network, comprising:
  a transceiver subsystem configured to enable communication with a plurality of neighboring communication nodes in the cellular communication network; and
  a processing subsystem associated with the transceiver subsystem adapted to:
    iteratively exchange messages with a plurality of neighboring base stations in the cellular communication network based on a factor graph until one or more predefined stopping criteria are satisfied, the factor graph modeling discrete local parameters to be coordinated among base stations in the cellular communication network and corresponding local performance metrics of the base stations, wherein the discrete local parameters represent precoding matrices to be utilized for one of a group consisting of downlinks from the base stations to mobile terminals served by the base stations and uplinks from the mobile terminals served by the base stations to the base stations; and
    compute an optimal value for the local parameter of the base station based on results of iteratively exchanging the messages with the plurality of neighboring base stations.

* * * * *